(12) United States Patent
Low et al.

(10) Patent No.: US 6,955,558 B1
(45) Date of Patent: Oct. 18, 2005

(54) CABLE AND APPARATUS INTERFACE SECURITY DEVICE

(75) Inventors: David Low, New Lenox, IL (US); Albert Cox, Orland Park, IL (US); Tim Crawford, Country Club Hills, IL (US); Richard Korczak, Channahon, IL (US); Raymond Horvath, Tinley Park, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 10/709,270

(22) Filed: Apr. 26, 2004

(51) Int. Cl.[7] .............................................. H01R 13/58
(52) U.S. Cl. ..................................... 439/467; 439/587
(58) Field of Search ................................ 439/586, 589, 439/587, 467, 456; 174/91, 92, 93; 428/36.9

(56) References Cited

U.S. PATENT DOCUMENTS

| | | | |
|---|---|---|---|
| 3,715,459 A * | 2/1973 | Hoffman ................. 174/138 F |
| 4,084,066 A * | 4/1978 | Gillemot ....................... 174/92 |
| 4,880,676 A * | 11/1989 | Puigcerver et al. ........ 428/35.7 |
| 4,944,976 A * | 7/1990 | Plummer, III .............. 428/36.9 |
| 5,214,248 A * | 5/1993 | Jamison ....................... 174/92 |
| 5,382,756 A * | 1/1995 | Dagan .......................... 174/92 |
| 5,505,230 A * | 4/1996 | Bartholomew .............. 138/164 |
| 5,525,073 A | 6/1996 | Sampson |
| 5,561,269 A | 10/1996 | Robertson et al. |
| 5,574,259 A * | 11/1996 | Meltsch et al. ................ 174/91 |
| 5,684,274 A | 11/1997 | McLeod |
| 5,691,508 A | 11/1997 | Radliff et al. |
| 5,796,041 A | 8/1998 | Suzuki et al. |
| 5,824,956 A * | 10/1998 | Garban et al. ................. 174/93 |
| 5,828,005 A | 10/1998 | Huynh-Ba et al. |
| 5,834,690 A * | 11/1998 | Bastiaansen ................. 174/52.1 |
| 5,844,171 A * | 12/1998 | Fitzgerald ..................... 174/92 |
| 6,037,544 A | 3/2000 | Lee et al. |
| 6,087,593 A | 7/2000 | Skipworth et al. |
| D432,092 S * | 10/2000 | Stebleton et al. .......... D13/156 |
| 6,169,250 B1 * | 1/2001 | Bolcato ....................... 174/92 |
| 6,177,634 B1 * | 1/2001 | Smith .......................... 174/92 |
| 6,265,665 B1 | 7/2001 | Zahnen |
| 6,280,235 B1 * | 8/2001 | Radliff ....................... 439/467 |
| 6,359,228 B1 * | 3/2002 | Strause et al. ................ 174/91 |
| 6,544,070 B1 | 4/2003 | Radliff |
| 6,545,219 B1 * | 4/2003 | Bukovnik et al. ........ 174/74 A |
| 6,677,531 B2 * | 1/2004 | Fukushima et al. ....... 174/84 C |
| 6,706,968 B2 | 3/2004 | Yaworski et al. |
| 6,730,846 B1 * | 5/2004 | Muller ...................... 174/74 R |
| 6,758,808 B2 * | 7/2004 | Paul et al. .................. 600/229 |

* cited by examiner

Primary Examiner—Alexander Gilman
(74) Attorney, Agent, or Firm—Babcock IP, LLC

(57) ABSTRACT

A sealing assembly for a cable to apparatus interconnection formed by a plurality of shells adapted to mate together, surrounding the interconnection within an interconnection space. When mated together, the shells forming openings for the cable and the apparatus at an apparatus end and a cable end, respectively. A gasket mounted to each shell along a mating surface between the shells and along the openings environmentally seals the interconnection space. A locking rib projecting inward from the shell(s) may be applied to rotationally interlock a coupling nut of the interconnection with the sealing assembly. In a two shell embodiment, a locking band positioned around an outer diameter of the mated together shells with an end to end retaining means may be used to secure the shells together. Alternatively, if three shells are used, the shells may be hinged together and a retaining means applied to join the unhinged ends together.

14 Claims, 8 Drawing Sheets

CABLE AND APPARATUS INTERFACE SECURITY DEVICE

BACKGROUND OF INVENTION

1. Field of the Invention

The invention relates to a device for environmentally sealing and securing the interconnection between cables and or apparatus, for example feed and or control cables interconnected with an antenna.

2. Description of Related Art

Electrical interconnections are subject to degradation from environmental factors such as moisture, vibration and repeated expansion and contraction from daily temperature changes.

Environmental seals such as an outer sealing enclosure that surrounds an electrical interconnection have been used, for example, to surround a cable end connector to cable end connector interconnection. The, for example, injection molded plastic enclosures have been configured to surround the cable interconnection with two halves in a clamshell hinged configuration that is sealed with a gel composition at cable exit points proximate either end. Alternatively, the enclosure may be entirely filled with a gel composition to provide a watertight and vibration dampening seal. The gel composition is useful because the exact radius of the cable that is sealed against may vary. However, gel sealing compositions are typically limited to environments where the temperature will be 60 degrees Celsius or less. Distribution to and or storage in equatorial regions may expose the sealing assemblies to temperatures in excess of 85 degrees Celsius, outside of the temperature range of gel seals. Also, in the frequently vertical configuration of a cable to antenna attachment, a sealing system using gel near the maximum specified temperature may become compromised due to gel migration and or leakage.

The prior enclosures typically use multiple hook into slot closure configurations which, once closed, may be difficult to open, especially when installed in exposed locations such as atop radio towers. Gel seals are typically not reusable and or have only a limited number of re-uses before they must be replaced.

Vibration may lead to loosening and eventual release of threaded interconnections. Prior enclosures that seal against the cables entering and leaving the enclosure typically surround the interconnection point without specifically contacting rotatable nuts or the like of the connector. Therefore, an enclosure that provides an acceptable environmental seal may fail to prevent vibration, for example induced by wind upon exposed cable runs along radio towers, from eventually loosening and degrading the mechanical and electrical interconnection of the enclosed connector(s).

Feed and or control cable connections to antennas are also subject to environmental degradation. The interconnection with an antenna is typically to a connector body mounted to an exterior surface of the antenna. Therefore, there is a limited surface area on the antenna side of the interconnection with which to form a seal. Because of this, prior practice has been to seal the antenna interconnection, or other apparatus with similar exterior surface mounted connectors, using a time consuming sealing wrap using rolls of butyl rubber, plastic and heat or cold shrink tape. The reliability of this form of manually applied seal is dependant upon the training and motivation of the installation personnel, which may be negatively influenced by the often hazardous and or environmentally exposed locations, for example high atop radio towers, where they are installed. Further, once installed, a sealing wrap must be destroyed to again access the interconnection.

Competition within the electrical interface environmental seal industry has focused attention on reliability, reusability, ease of use, improved high temperature capabilities and overall reductions in manufacturing and installation costs.

Therefore, it is an object of the invention to provide a device that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
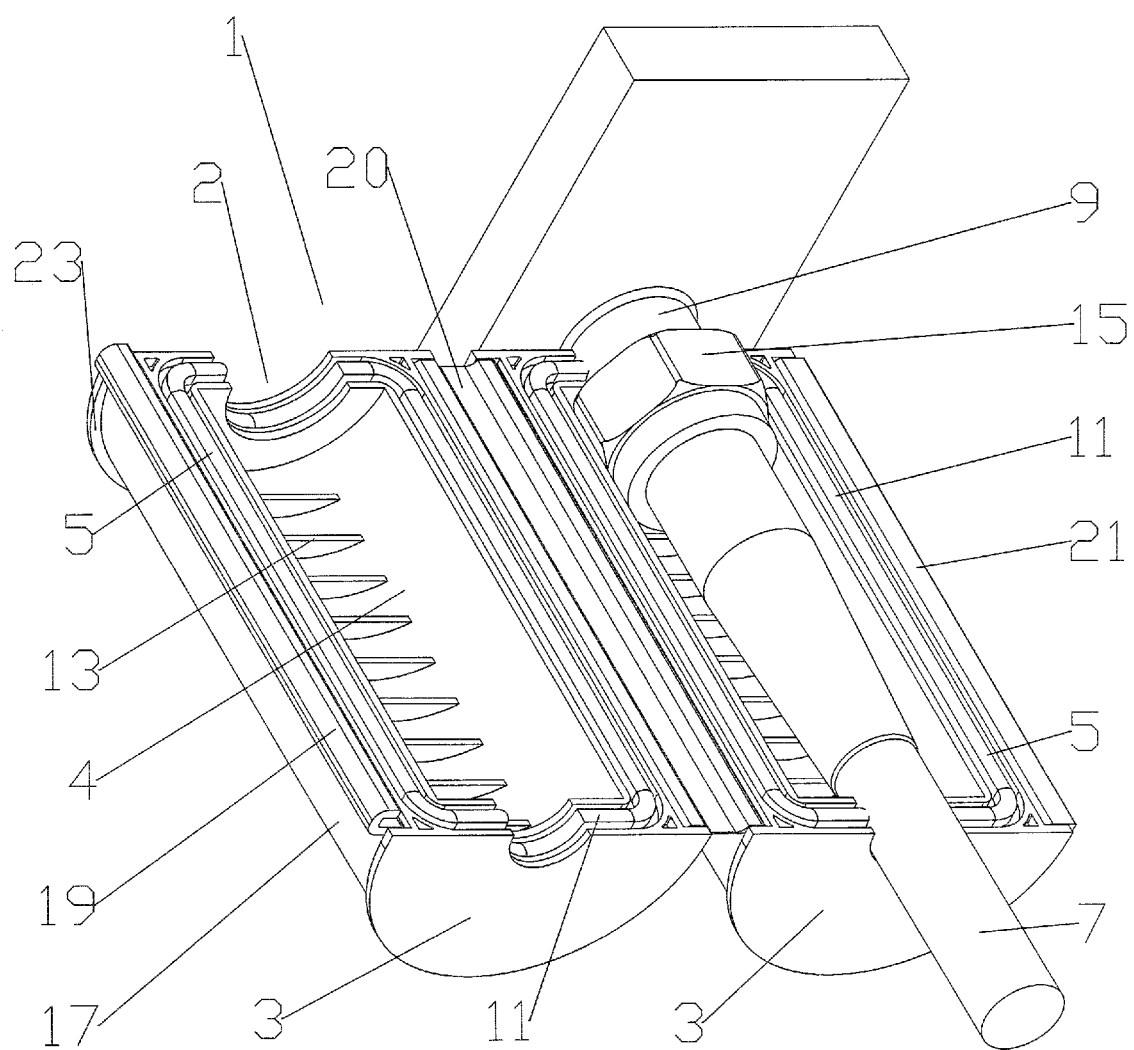
FIG. 1 is an isometric view of a first embodiment of the invention in an open position with a cable to apparatus connection in place for closure.
Figure 2:
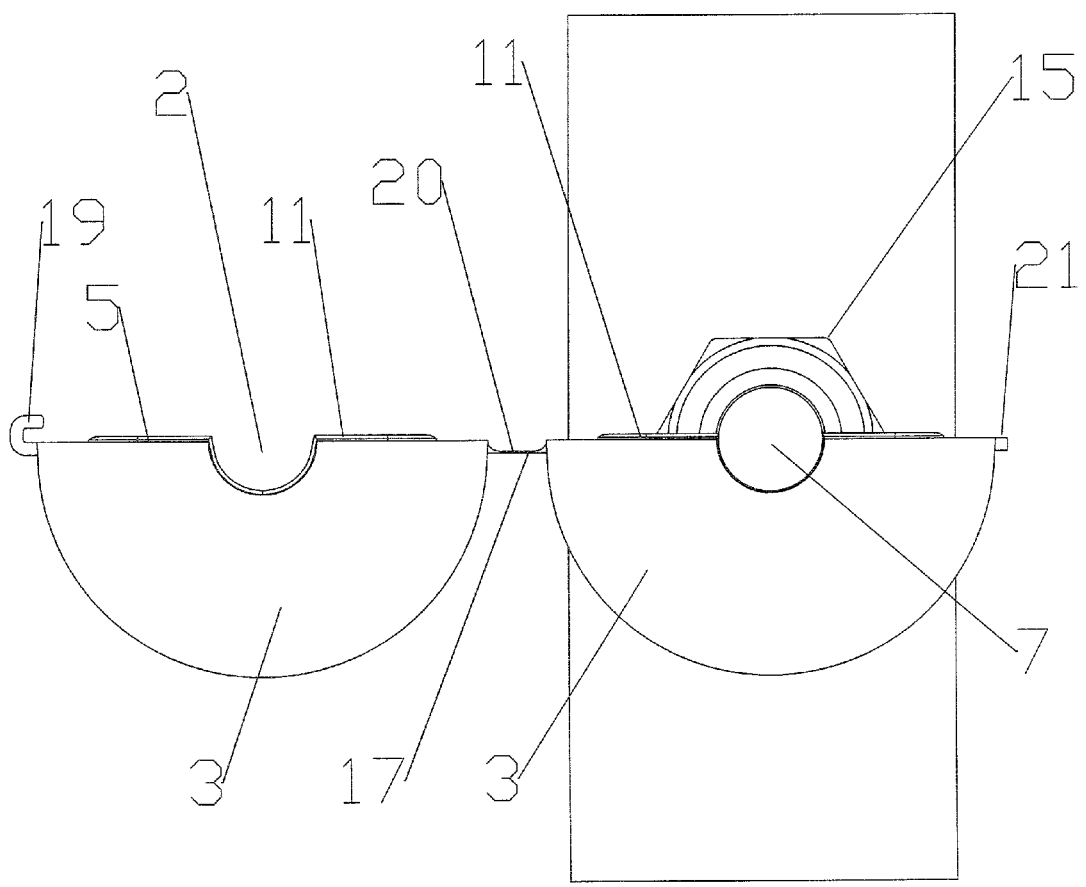
FIG. 2 is a schematic end view of the first embodiment as shown in FIG. 1.

Connections to an apparatus, for example an antenna, are typically made to a connector body or other connection assembly mounted to an exterior surface of the antenna. Because the connector body or other connection assembly is flush against a surface, a cable to cable interconnection sealing assembly that tapers at either end to the same cable diameter is unusable.

As shown for example by FIGS. 1–6, a sealing assembly 1 according to a first embodiment of the invention has internal shell 3 halves adapted to seal against each other and around a desired interconnection space 4. The shell 3 halves may be formed, for example, from an impact resistant plastic using injection molding.

The mating surface(s) 5 of the shell 3 halves are adapted to mate with each other and around opening(s) 2 formed between the shell(s) 3 dimensioned to accept the outer diameter of the cable 7 and or apparatus connector body 9 at a cable end 6 and an apparatus end 8, respectively.

A gasket 11 lines each mating surface 5 to seal the interconnection of each shell 3 half with the other and around the outer diameter of the cable 7 and the apparatus connector body 9. The gasket 11 may be formed from, for example, liquid injection molded/liquid silicone rubber, thermoplastic elastomers, molded closed-cell foam or the like having suitable sealing and environmental resistance and stability characteristics.

A plurality of locking rib(s) 13 or the like may be formed on internal surfaces of the shell 3 halves projecting into the interconnection space 4, dimensioned to contact a coupling nut 15 which mates with the apparatus connector body 9 to connect the cable 7 to the apparatus. The locking rib(s) 13 prevent rotation of the coupling nut 15 within the interconnection space 4, thereby inhibiting unthreading of the coupling nut 15.

A locking band 17 is adapted to surround the two halves 3, retaining them in a sealing position around the cable 7 and the apparatus connector body 9. The locking band 17 may have a hinged portion 20 formed, for example, as a hinge or alternatively as a living hinge to aid closure of the locking band 17 around the shell 3 halves. The locking band 17 is securable around the shell 3 halves, linked end to end to itself via a retention means such as, for example, a hook 19 which interlocks with a fin 21 or the like. The locking band 17 is retained axially upon the shell 3 halves between shoulder(s) 23 formed at either end of each shell 3 half.

Figure 3:
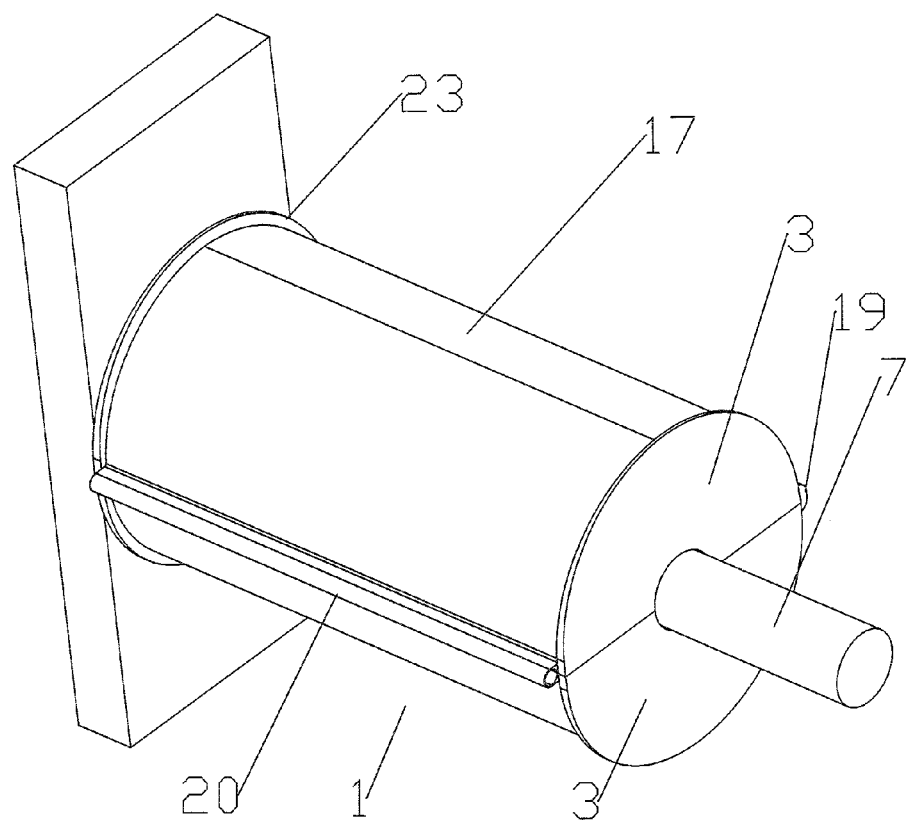
FIG. 3 is an isometric view of the first embodiment closed around the cable to apparatus interconnection.
Figure 4:
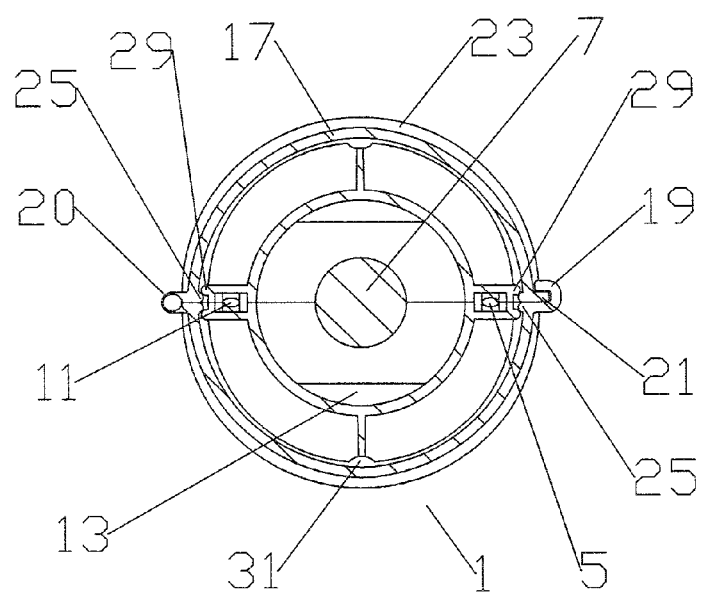
FIG. 4 is a cross-sectional end view of FIG. 3.
Figure 5:
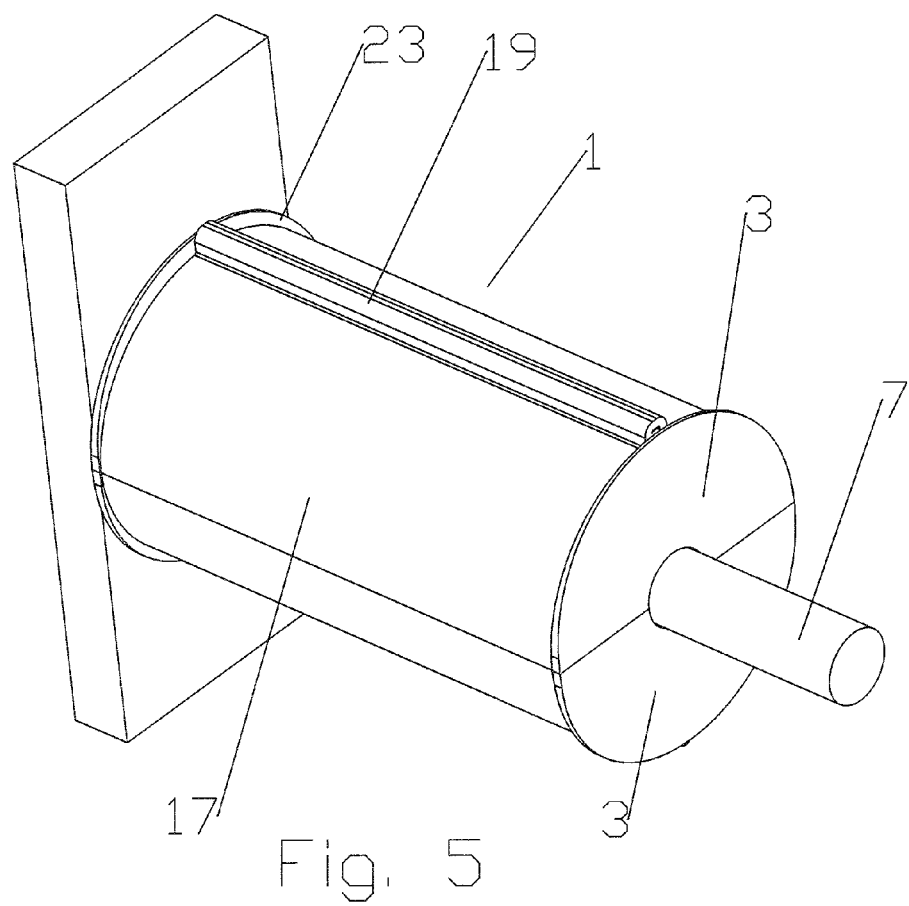
FIG. 5 is an isometric view of the first embodiment closed and locked around the cable to apparatus interconnection.
Figure 6:
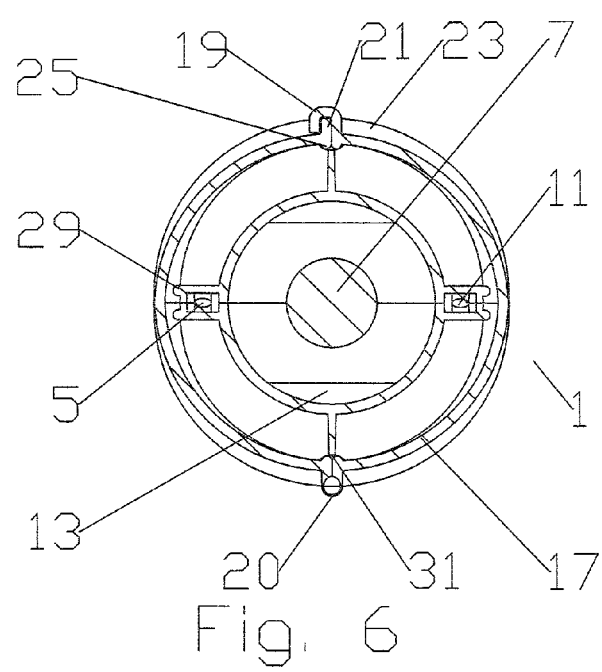
FIG. 6 is a cross-sectional end view of FIG. 5.
Figure 7:
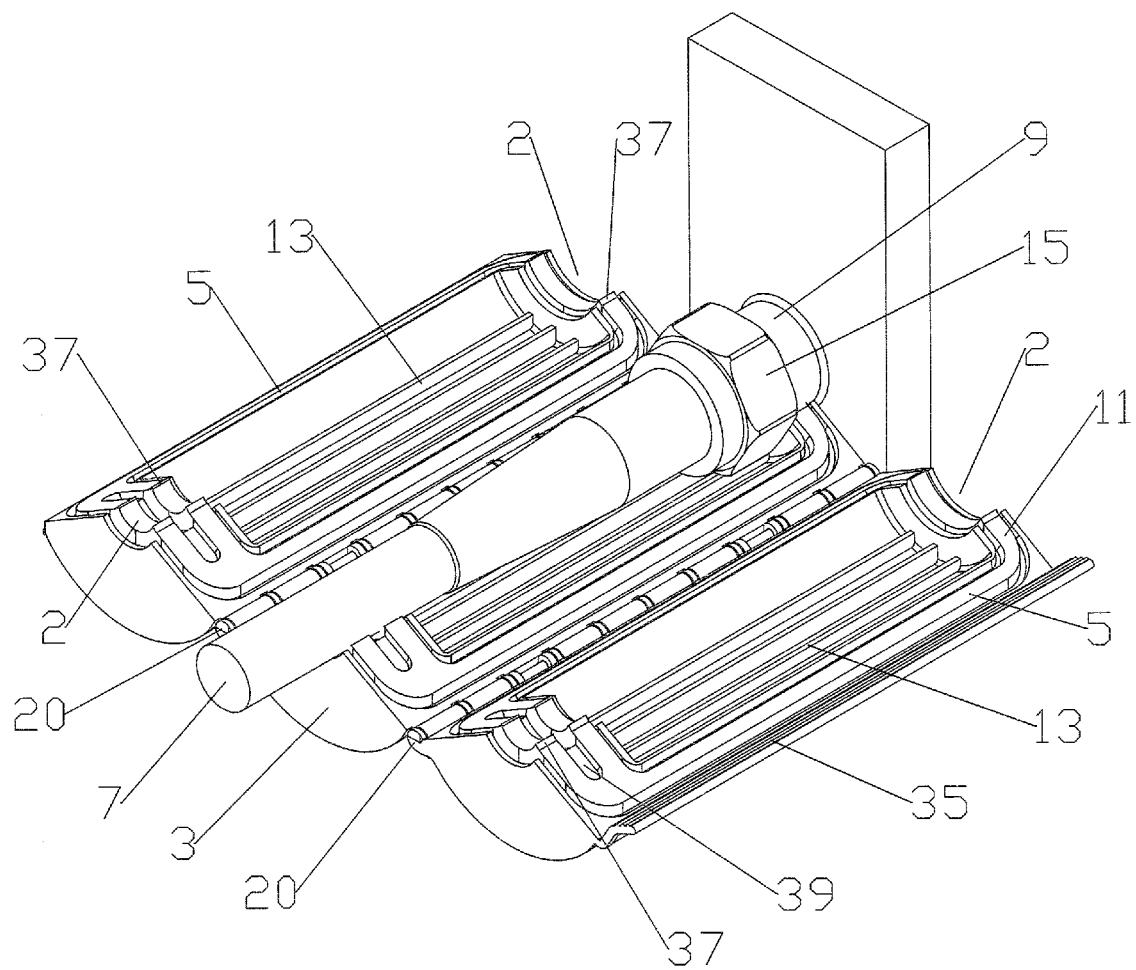
FIG. 7 is an isometric view of a second embodiment of the invention in an open position with a cable to apparatus connection in place for closure.
Figure 8:
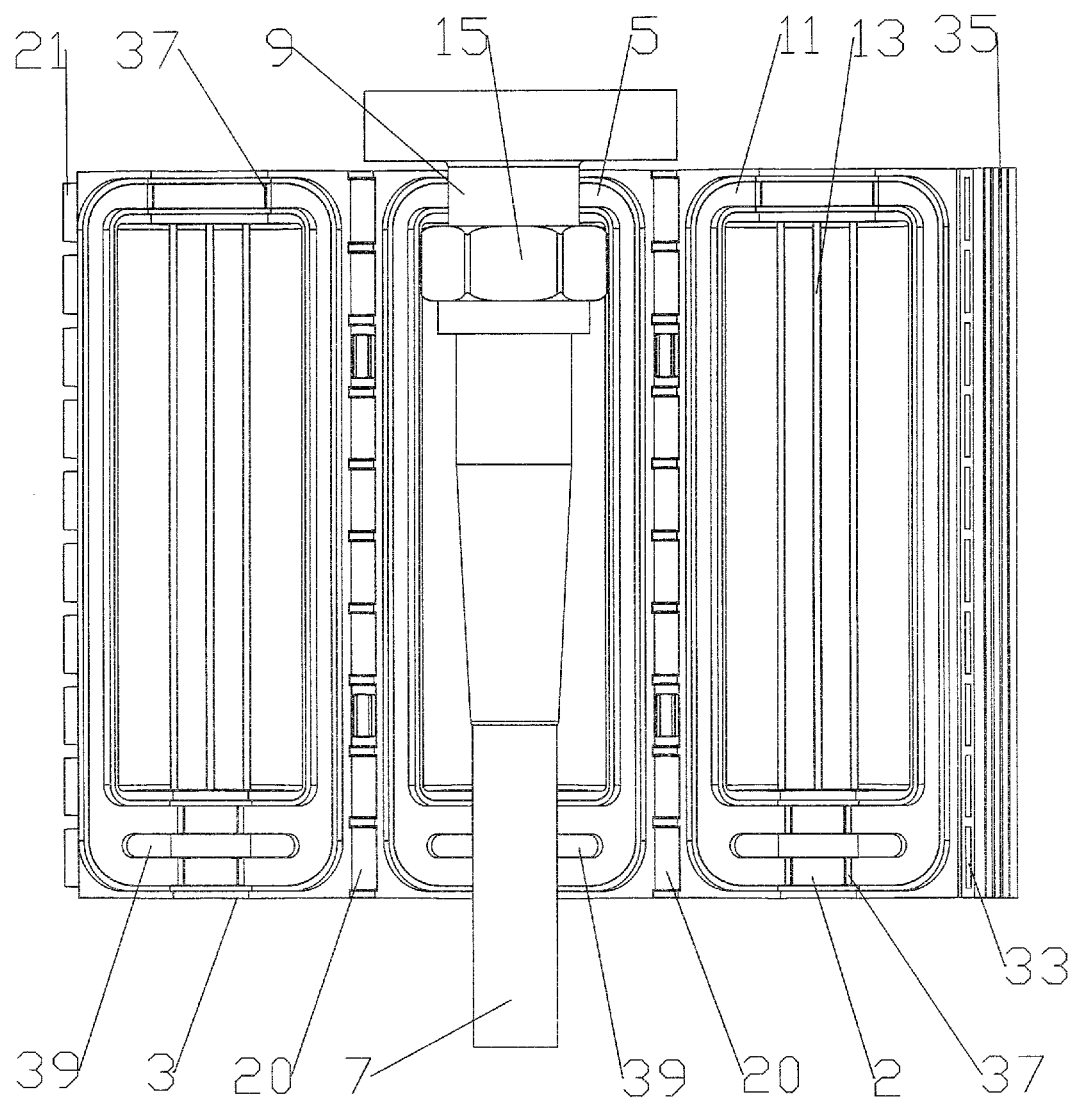
FIG. 8 is a schematic top view of the second embodiment as shown in FIG. 7.
Figure 9:
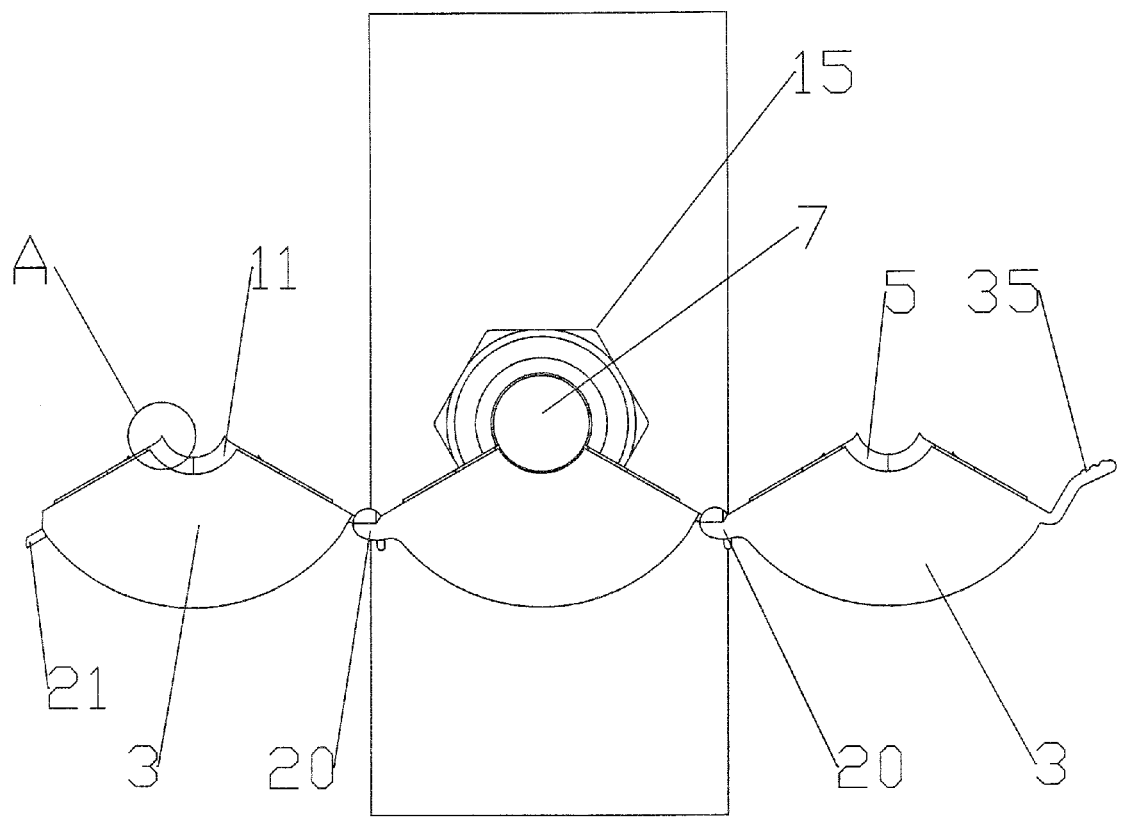
FIG. 9 is a schematic end view of the second embodiment as shown in FIG. 7.
Figure 10:
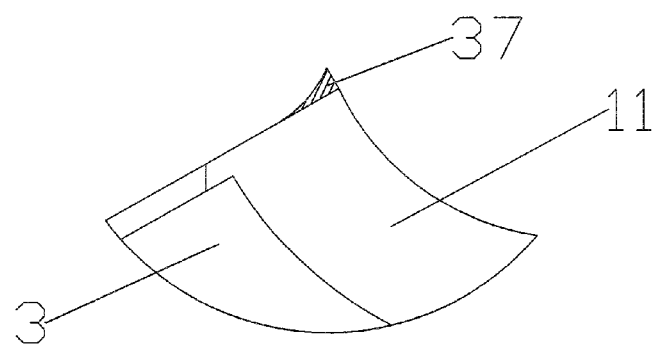
FIG. 10 is a close up view of area A of FIG. 9.
Figure 11:
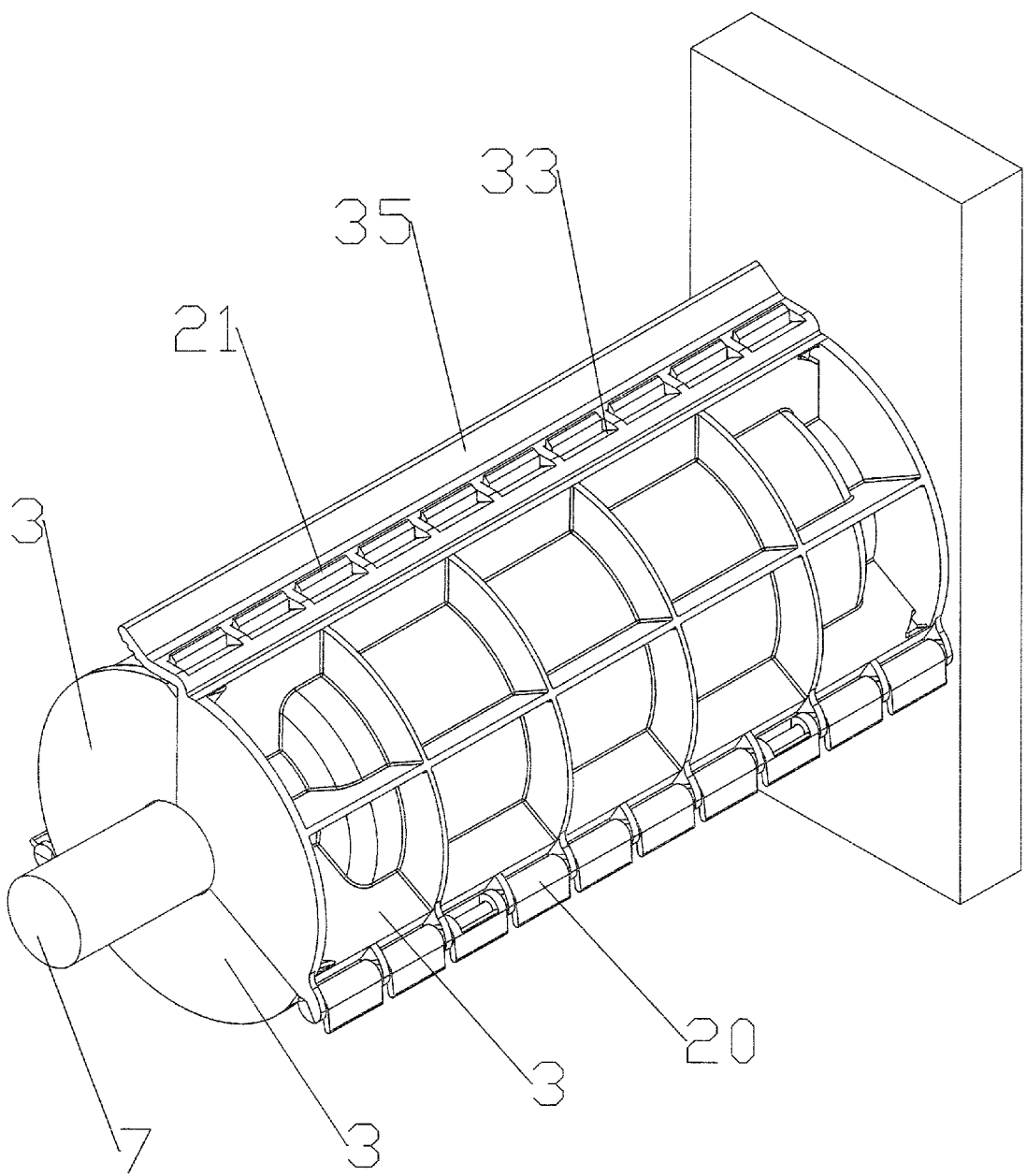
FIG. 11 is an isometric view of the second embodiment closed and locked around the cable to apparatus connection.

As shown in FIGS. 3 and 4, once secured, the locking band 17 loosely retains the shell 3 halves around the cable 7 and apparatus connector body 9. Inward projecting protrusions 25 at hinged portion 20 and closure point 27 retain the locking band 17 in a closed position nested between outward projecting protrusions 29 formed at the mating surface(s) 5 of the two shell 3 halves. The locking band 17 is rotatable past the outward projecting protrusions 29 around the two shell 3 halves to a locked position whereby the inward projecting protrusions 26 engage and interlock with depression(s) 31 formed in each shell 3 half. Mated together the two shell 3 halves form an elliptical cross section with a decreased outer diameter at the mating surface(s) 5 and an increased diameter proximate the depression(s) 31. Thereby, as the locking band 17 is rotated from the closed position to the locked position, as shown in FIGS. 5 and 6, the pressure exerted inwards by the locking band 17 upon the two shell 3 halves and the gasket(s) 11 between them increases. Preferably, the depression(s) 31 are formed at a half-way point between the mating surface(s) 5 so that the increased inward pressure of the locked position evenly pressures the gasket(s) 11 toward each other and against the cable 7 and apparatus connector body 9.

In use, the sealing assembly 1 is applied by pressing the cable 7 and apparatus connector body 9 into place, seated in one of the shell 3 halves. The shell 3 half is oriented so that the locking rib(s) 13 seat against the coupling nut 15 and the other shell 3 half mated with the first shell 3 half, enclosing the interconnection of the cable 7 and apparatus connector body 9 between them. The locking band 17 is then wrapped around the shell 3 halves and the hook 19 mated with the fin 21. The sealing assembly 1 is then locked by rotating the locking band 17 about the two shell 3 halves from the closed to locked position where the inward projecting protrusion(s) 26 of the locking band 17 engage the depression(s) 31.

To remove the sealing assembly 1, the locking band 17 is rotated from the locked to closed position where the reduced cross section of the shell 3 halves creates additional play to enable the hook 19 to be disengaged from the fin 21. Once opened or fully removed, the sealing assembly 1 may be reused.

In a second embodiment, as shown in FIGS. 7–11, similar elements notated as described with respect to the first embodiment, the shell 3 halves of the first embodiment are replaced with three shell 3 wedges. The shell 3 wedges are hinged together via hinge portion(s) 20. The shell 3 wedges are adapted to encircle a cable 7 and apparatus connector body 9 and interlock with each other via a retention means here arranged as a plurality of holes 33 that engage a plurality of fin(s) 21. A locking bar 35 that extends from the holes 33 creates a lever operable my hand for ease of closure and re-opening of the sealing assembly 1.

Because the shell 3 wedges section the circumference of the sealing assembly 1 into thirds, the opportunity for pinching of the gasket(s) 11 during closure is reduced. The locking band may be omitted because when closed, the shell 3 wedge geometry of the second embodiment improves equalization of the pressure between adjacent gasket 11 surfaces and inwards towards the cable 7 and apparatus connector body 9. To form an improved seal at the junction between each adjacent gasket 11 and the cable 7 or apparatus connector body 9, protruding compensation spike(s) 37 as shown for example in FIG. 10 may be formed in the gasket 11. The increased gasket material added via the compensation spike(s) 37 increases the sealing pressure between the gasket(s) 11 and also against the cable 7 or connector body 9.

As demonstrated in the second embodiment, the gasket(s) 11 may be adapted to have increased contact area via an increased width along the longitudinal axis of the cable 7 to improve sealing against, for example, a range of different possible annular or helical corrugations that may be formed in the outer conductors of the various cable(s) 7 that the sealing assembly 1 may be installed upon. To minimize the expense of additional gasket 11 material, the increased contact area may be formed with an inner groove 39 that divides the seal into two separate seals.

One skilled in the art will appreciate that the embodiments described herein may also be adapted for other apparatus and cable interconnection configurations. For example, the apparatus connector body 9 may exit a side of the apparatus for connection with a cable 7 or jumper having a right angle apparatus connector body. For this and other situations, the sealing assembly 1 according to the various embodiments of the invention may be modified so that the shell 3 halves or shell 3 wedges and respective openings are adapted to surround the desired cable and apparatus interconnection.

From the foregoing, it will be apparent that the present invention brings to the art a sealing assembly 1 useful, for example, for re-useable sealing of cable to apparatus connections having improved performance, ease of installation and significant manufacturing and installation cost efficiencies.

| Table of Parts | |
|---|---|
| 1 | sealing assembly |
| 2 | opening |
| 3 | shell |
| 4 | interconnection space |
| 5 | mating surface |
| 7 | cable |
| 9 | apparatus connector body |
| 11 | gasket |
| 13 | locking rib |
| 15 | coupling nut |
| 17 | locking band |
| 19 | hook |
| 20 | hinged portion |
| 21 | fin |
| 23 | shoulder |
| 25 | inward projecting protrusion |
| 27 | closure point |

-continued

Table of Parts

| | |
|---|---|
| 29 | outward projecting protrusion |
| 31 | depression |
| 33 | hole |
| 35 | locking bar |
| 37 | compensation spike |
| 39 | inner groove |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A sealing assembly for a cable to apparatus interconnection, comprising:

two shells adapted to mate together, surrounding the interconnection within an interconnection space;

when mated together, the shells forming openings for the cable and the apparatus at an apparatus end and a cable end, respectively;

a gasket mounted to each shell along a mating surface between the shells and along the openings;

a locking band around an outer diameter of the mated together shells, the locking band having a retaining means for end to end interconnection;

the outer diameter having a minimum radius at the mating surface between the shells; and a depression in an outer surface of each shell formed proximate a midpoint between the mating surfaces;

the depressions receiving an inward projecting protrusion of the locking collar as the locking collar is rotated about the shells from a closed to a locked position.

2. The device of claim 1, wherein the retaining means is a hook over fin closure.

3. The device of claim 1, wherein the locking band is seated between shoulders formed in the shells.

4. The device of claim 1, wherein the gasket is formed from one of a liquid injection molded silicone rubber, liquid silicone rubber, thermoplastic elastomer and molded dosed-cell foam.

5. The device of claim 1, wherein the locking band is segmented into two halves by a hinge portion.

6. The device of claim 1, wherein the shell has at least one locking rib projecting into the connection area to rotatably interlock the shell with a coupling nut of the interconnection.

7. The device of claim 1, wherein a width along a longitudinal axis of the gaskets along the openings is greater at the cable end than at the apparatus end.

8. A sealing assembly for a cable to apparatus interconnection, comprising:

three shells adapted to mate together, surrounding the interconnection within an interconnection space;

when mated together, the shells forming openings for the cable and the apparatus at an apparatus end and a cable end, respectively;

a gasket mounted to each shell along a mating surface between the shells and along the openings;

a hinge portion between each of the shells;

a retaining means adapted to retain the shells in a mated together configuration around the interconnection; and a plurality of compensation spikes formed protruding from the gasket(s) proximate a contact point between each of the gasket(s) with each other and the cable.

9. The device of claim 8, wherein at least one shell has at least one locking rib projecting into the connection area to rotatably interlock the shell with a coupling nut of the interconnection.

10. The device of claim 8, wherein the gasket is formed from one of a liquid injection molded silicone rubber, liquid silicone rubber, thermoplastic elastomer and molded closed-cell foam.

11. The device of claim 8, wherein the retaining means is at least one hole which mates with at least one fin.

12. The device of claim 11, wherein a locking bar operable as a lever extends from the retaining means, along the longitudinal length, of the retaining means.

13. The device of claim 8, wherein a width along a longitudinal axis of the gaskets along the openings is greater at the cable end than at the apparatus end.

14. The device of claim 13, wherein an inner groove is formed in the gasket at the cable end.

* * * * *